United States Patent
Holstine et al.

(10) Patent No.: US 11,465,762 B2
(45) Date of Patent: Oct. 11, 2022

(54) SYMMETRIC ROLL DIVERGENCE

(71) Applicant: AMI Industries, Inc., Colorado Springs, CO (US)

(72) Inventors: Steve Holstine, Colorado Springs, CO (US); Kassidy L. Carson, Colorado Springs, CO (US); Casey Andrew Stribrny, Colorado Springs, CO (US); Nicholas K. Bharucha, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 102 days.

(21) Appl. No.: 16/983,622

(22) Filed: Aug. 3, 2020

(65) Prior Publication Data

US 2022/0033096 A1    Feb. 3, 2022

(51) Int. Cl.
*B64D 25/10*    (2006.01)

(52) U.S. Cl.
CPC .................. *B64D 25/10* (2013.01)

(58) Field of Classification Search
CPC ..................................... B64D 25/10
See application file for complete search history.

(56) References Cited

U.S. PATENT DOCUMENTS

| | | | |
|---|---|---|---|
| 3,265,337 A | 8/1966 | Martin | |
| 3,481,568 A | 12/1969 | McIntyre et al. | |
| 3,606,221 A | 9/1971 | Morris et al. | |
| 3,648,955 A * | 3/1972 | Stencel | B64D 25/10 244/122 AD |
| 4,236,687 A | 12/1980 | Stone et al. | |
| 4,667,903 A | 5/1987 | Herndone | |
| 4,721,273 A * | 1/1988 | Trikha | B64D 25/10 244/122 AB |
| 4,749,153 A * | 6/1988 | Herndon | B64D 25/10 244/122 A |
| 6,173,218 B1 * | 1/2001 | Vian | G05B 13/027 701/1 |
| 6,591,602 B1 | 7/2003 | Ruff | |
| 7,578,472 B2 * | 8/2009 | Mastrolia | B64D 25/10 244/122 A |

FOREIGN PATENT DOCUMENTS

| | | |
|---|---|---|
| CN | 109466778 | 3/2019 |
| GB | 1342912 | 1/1974 |

OTHER PUBLICATIONS

United Kingdom Intellectual Property Office, United Kingdom Search Report dated Sep. 30, 2021 in Application No. GB2111187.7.

* cited by examiner

*Primary Examiner* — Richard G Davis
(74) *Attorney, Agent, or Firm* — Snell & Wilmer L.L.P.

(57) ABSTRACT

An ejection seat for an aircraft is disclosed. In various embodiments, the ejection seat includes a base, a divergence rocket attached to the base, and a compensation rocket attached to the base.

20 Claims, 5 Drawing Sheets

SYMMETRIC ROLL DIVERGENCE

FIELD

The present disclosure relates to ejection seats and, more particularly, to ejection seats having divergence roll thrusters used to cause a pilot and seat to diverge from a centerline of the direction of travel of the aircraft and compensation roll thrusters configured to counteract and stabilize the ejection seat following divergence from the centerline.

BACKGROUND

In various aircraft, two or more ejection seats are provided within a cockpit and typically arranged in tandem, either side by side or one behind the other. Under certain circumstances, the seats are ejected from the aircraft simultaneously, typically in the event of an emergency. During an ejection sequence or operation, an initial thrust to propel the seat and occupant upwardly out of the aircraft is provided, either by means of a rocket or a catapult, or both, and a seat rail is customarily provided to guide the upward path of the ejecting seat. The orientation of the seat rails in combination with the aerodynamic forces applied by the airstream and the thrust forces applied by the rocket serve to control the trajectory or path of flight of the seat and the occupant.

During the ejection sequence or operation, if two or more ejection seats are simultaneously ejected upwardly without any trajectory correction, there exists a possibility that such seats may collide with one another or that the occupants may collide with one another as they are released from their respective seats or even that one occupant may collide with the seat of another occupant. Additionally, as the occupants are released from the seats, their parachutes are deployed into the airstream and it is essential that such parachutes do not become fouled or entangled with the seats or with the parachute of another occupant.

One method of avoiding the aforementioned concerns is to provide a means whereby the trajectories of the ejection seats diverge from one another. While this may be accomplished by means of a roll divergence, such procedure gives rise to certain potential problems. These problems are caused by the fact that when roll is introduced into the upwardly ejecting seat, it causes a roll movement at a certain rate that tends to continue even after the seat has exited the cockpit. The problems that arise from this continuing tendency to roll may be understood when considered in connection with the introduction of a roll rate—e.g., a generally time dependent rate of seat rotation about its roll axis—during the ejection sequence or operation. More specifically, in order to accomplish divergence of the ejection seat trajectories, a force is applied to the ejection seat that causes the seat to rotate about its roll axis. This force and the resulting rotation will cause the desired divergence, but the force will additionally start the seat spinning about its roll axis at a certain rate. Because the seat is rotating at a particular roll rate, when the pilot or occupant is released from the seat, he or she too will be turning at this same roll rate, which means that he or she may be rotating about the roll axis when entering the airstream and when the parachute is deployed. The continuing tendency to roll may thus create problems, including injury to the pilot or occupant, during the ejection sequence or operation, particularly when deploying the parachute.

SUMMARY

An ejection seat for an aircraft is disclosed. In various embodiments, the ejection seat includes a base; a divergence rocket attached to the base; and a compensation rocket attached to the base.

In various embodiments, the ejection seat defines a roll axis, a yaw axis and a pitch axis, each of which is pair-wise perpendicular, and the divergence rocket is oriented in a first direction configured to produce a divergence roll moment about the roll axis. In various embodiments, the compensation rocket is oriented in a second direction configured to produce a compensation roll moment about the roll axis. In various embodiments, the compensation roll moment is opposite the divergence roll moment.

In various embodiments, the ejection seat further includes a main ejection rocket. In various embodiments, the divergence rocket is positioned on a first side of the main ejection rocket and the compensation rocket is positioned on a second side of the main ejection rocket, the second side spaced a lateral distance from the first side. In various embodiments, a divergence force that is generated by the divergence rocket is perpendicular to the roll axis. In various embodiments, a compensation force that is generated by the compensation rocket is perpendicular to the roll axis.

In various embodiments, the ejection seat further includes a processor coupled to the divergence rocket and the compensation rocket. In various embodiments, the processor is configured to fire the divergence rocket at a first time. In various embodiments, the processor is configured to fire the compensation rocket at a second time, the second time being after than the first time. In various embodiments, the first time is a first preset time following an initial time at which a main ejection rocket is fired. In various embodiments, the second time is a second preset time following the initial time at which the main ejection rocket is fired.

A method of controlling a trajectory of an ejection seat having a divergence rocket and a compensation rocket is disclosed. In various embodiments, the method includes firing the divergence rocket at a first time; and firing the compensation rocket at a second time, the second time being later than the first time.

In various embodiments, the first time is a first preset time following an initial time at which a main ejection rocket is fired. In various embodiments, the second time is a second preset time following the initial time at which the main ejection rocket is fired.

In various embodiments, the ejection seat defines a roll axis, a yaw axis and a pitch axis, each of which is pair-wise perpendicular, and the divergence rocket is oriented in a first direction configured to produce a divergence roll moment about the roll axis. In various embodiments, the compensation rocket is oriented in a second direction configured to produce a compensation roll moment about the roll axis, the compensation roll moment being opposite the divergence roll moment.

In various embodiments, a divergence force that is generated by the divergence rocket is perpendicular to the roll axis. In various embodiments, a compensation force that is generated by the compensation rocket is perpendicular to the roll axis.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
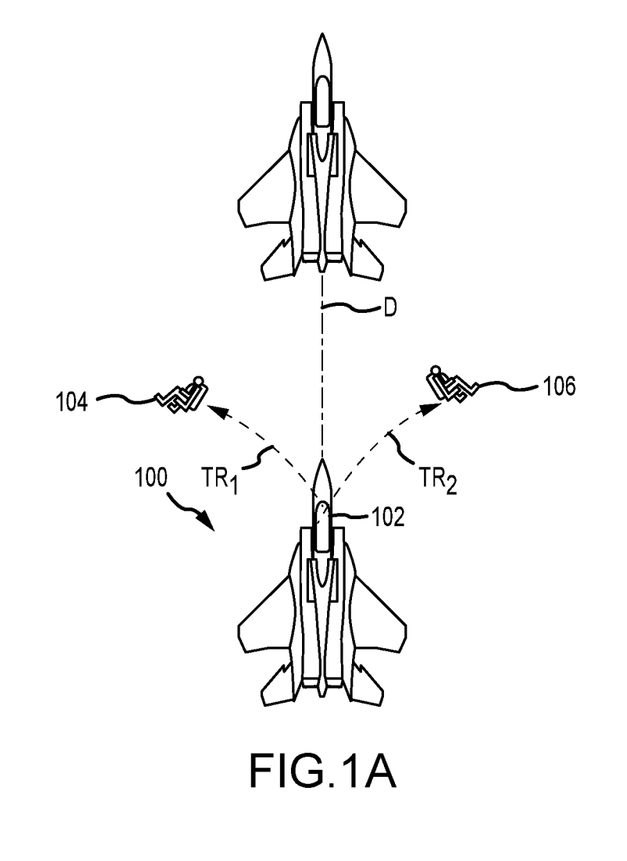
FIGS. 1A and 1B are schematic overhead and frontal views that illustrate an ejection sequence or operation where two pilots diverge from a centerline of the direction of travel of an aircraft, in accordance with various embodiments.
Figure 1B:
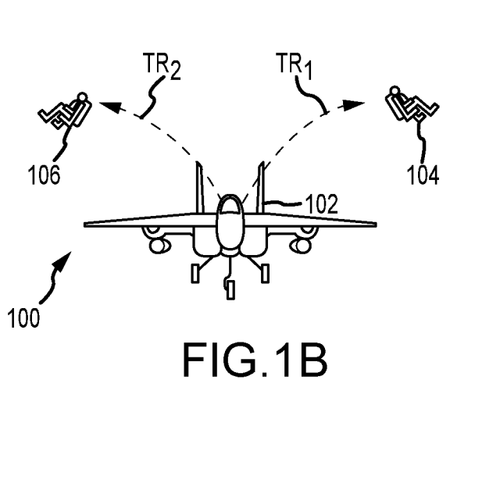

Referring now to the drawings, FIGS. 1A and 1B provide schematic overhead and frontal views, respectively, of an ejection sequence or operation where two pilots diverge from a centerline of the direction of travel of an aircraft, in accordance with various embodiments. More specifically, FIGS. 1A and 1B illustrate an aircraft 100 having a cockpit 102 configured for two pilots or occupants traveling in a flight direction D, which defines a centerline of the direction of travel of the aircraft 100. A first ejection seat 104 is positioned at the front of the cockpit 102 and a second ejection seat 106 is positioned at the rear of the cockpit 102, typically just behind the first ejection seat 104. As illustrated in both FIGS. 1A and 1B, during an ejection sequence or operation, the first ejection seat 104 (together with its occupant) is configured to travel along a first trajectory $TR_1$ while the second ejection seat 106 (together with its occupant) is configured to travel along a second trajectory $TR_2$. As will be described in further detail below, and in accordance with various embodiments, both the first ejection seat 104 and the second ejection seat 106 are configured to include a divergence rocket and a compensation rocket that, during operation, ensure the first trajectory $TR_1$ and the second trajectory $TR_2$ occur in a controlled manner without exhibiting a continuing rate of roll following commencement of the ejection sequence or operation.

Figure 2:
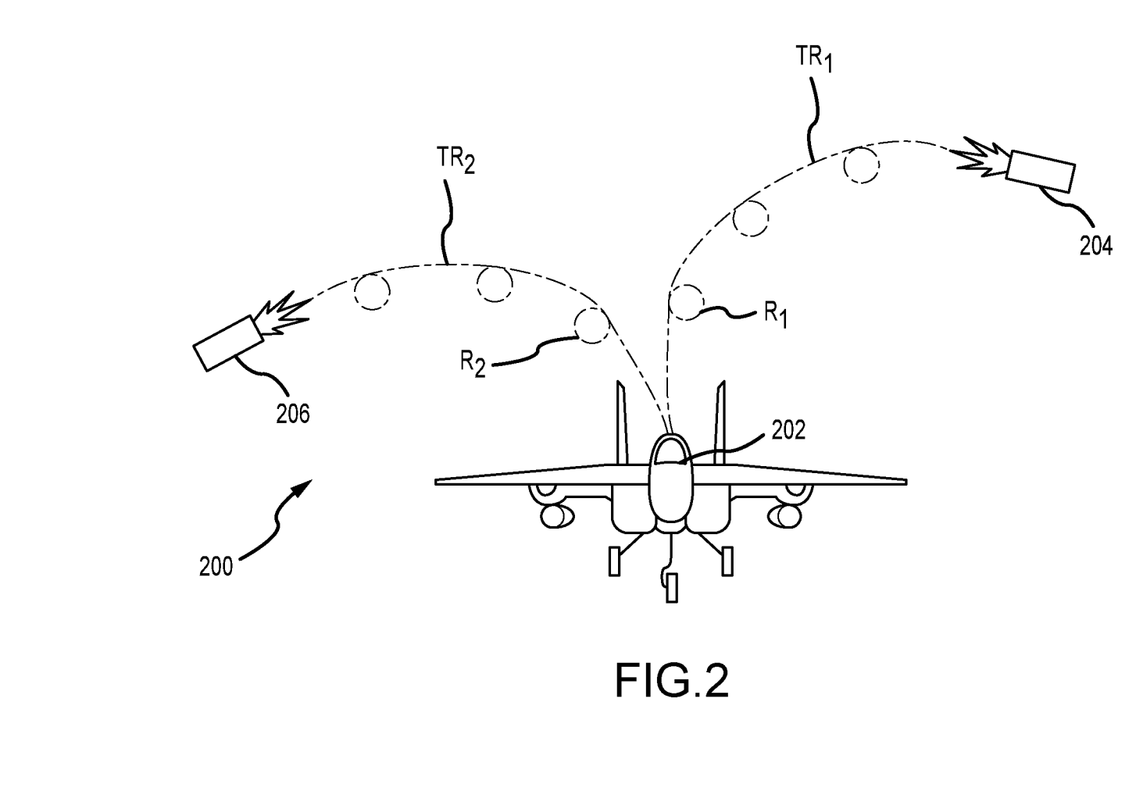
FIG. 2 is a schematic frontal view that illustrates the tendency for continuing roll about respective roll axes of two ejection seats and occupants during an ejection sequence or operation, in accordance with various embodiments.

Referring now to FIG. 2, a schematic frontal view is provided that illustrates a tendency for continuing roll about respective roll axes of two ejection seats and occupants during an ejection sequence or operation from an aircraft 200, in accordance with various embodiments. Similar to the aircraft 100 described above with reference to FIGS. 1A and 1B, the aircraft 200 has a cockpit 202 from which a first ejection seat 204 and a second ejection seat 206 (as well as the occupants) are positioned and configured for ejection in the event of an emergency. As illustrated in FIG. 2, during an ejection sequence or operation, the first ejection seat 204 (together with its occupant) travels along a first trajectory $TR_1$ while the second ejection seat 206 (together with its occupant) travels along a second trajectory $TR_2$. Both the first ejection seat 204 and the second ejection seat 206 include a divergence rocket that is configured to cause the ejection seats to diverge from a centerline of the direction of travel of the aircraft. As illustrated, however, once the divergence rocket fires, a force is applied to the ejection seats that cause them to rotate about the respective roll axes. This force and the resulting rotation cause the desired divergence, but the force also starts the ejection seats to spin about the roll axes at a certain rate, as illustrated by the rolls occurring along the trajectories—e.g., a first roll $R_1$ along the first trajectory $TR_1$ and a second roll $R_2$ along the second trajectory $TR_2$. As described next, and in accordance with various embodiments, both the first ejection seat 204 and the second ejection seat 206 may be configured to include a compensation rocket, in addition to the divergence rocket, that, when operated as described below, ensures the first trajectory $TR_1$ and the second trajectory $TR_2$ occur in a controlled manner without exhibiting a continuing rate of roll following commencement of the ejection sequence or operation.

Figure 3A:
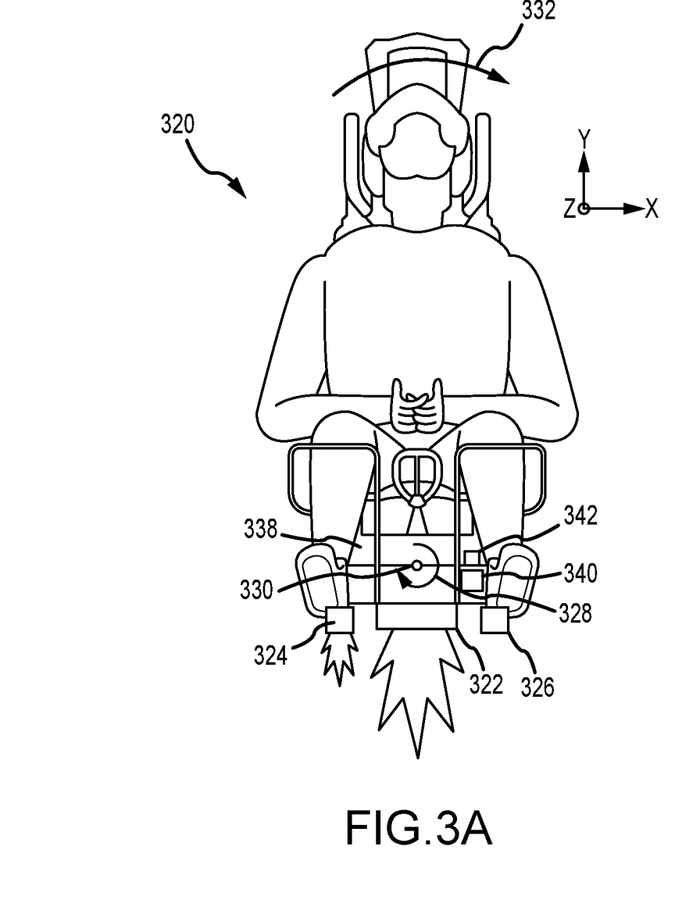
FIGS. 3A and 3B are schematic frontal views of an occupant within an ejection seat having a divergence rocket and a compensation rocket, in accordance with various embodiments.
Figure 3B:
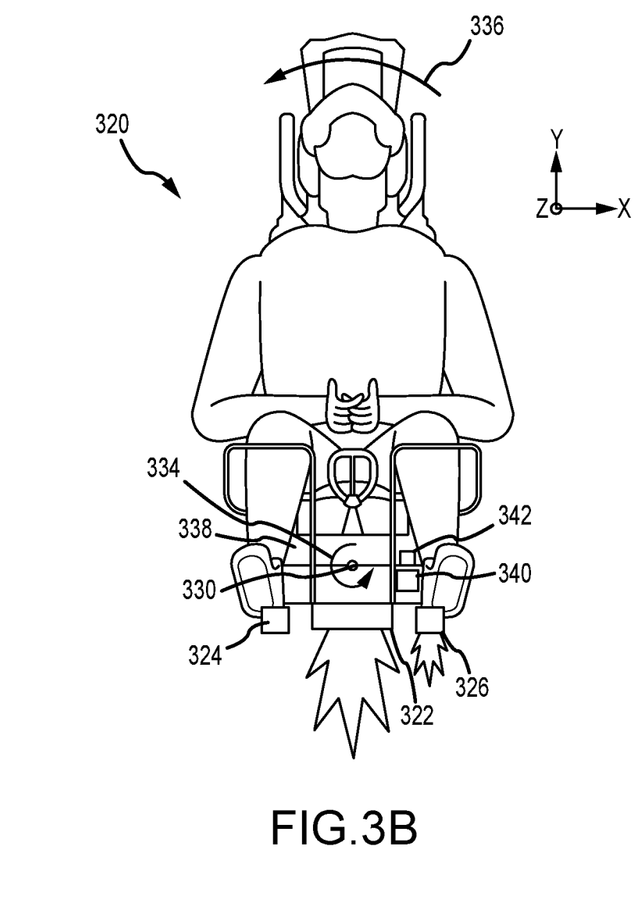

Referring now to FIGS. 3A and 3B, schematic frontal views of an occupant within an ejection seat 320 having a main ejection rocket 322, a divergence rocket 324 and a compensation rocket 326 are provided, in accordance with various embodiment. In various embodiments, and as illustrated, the divergence rocket 324 is positioned on a first side of the main ejection rocket 322 and the compensation rocket 326 is positioned on a second side of the main ejection rocket 322, the second side being spaced a lateral distance (e.g., in the X-direction) from the first side. The ejection seat 320 is similar to the first ejection seat 104 described above with reference to FIGS. 1A and 1B or the first ejection seat 204 described above with reference to FIG. 2 in that the ejection seat 320 is configured to diverge to the left side (or the port side) of an aircraft when deployed. A near identical ejection seat will be configured to diverge to the right side (or the starboard side) of the aircraft, the only difference being the positioning of the divergence rocket 324 and the compensation rocket 326 is reversed on the ejection seat configured to diverge to the right side of the aircraft than the positioning illustrated in FIGS. 3A and 3B. In various embodiments, the ejection seat 320 defines a roll axis, a yaw axis and a pitch axis, each of which is pair-wise perpendicular (e.g., the axes define a Cartesian triad or triplet).

During operation, the main ejection rocket 322 is fired at an initial time $T_0$ and the ejection seat 320 begins its ejection from a cockpit of the aircraft. Shortly after the initial time $T_0$, the divergence rocket 324 is fired at a first time $T_1$ and combusts for a divergence time period $\Delta T_D$. Firing the divergence rocket 324 generates a divergence force that produces a divergence roll moment 328 about a roll axis 330 that causes the ejection seat 320 to rotate about the roll axis 330 in a first roll direction 332 (e.g., a counterclockwise direction when viewed from the aft direction toward the forward direction of the aircraft) and at a first roll rate. After the ejection seat 320 has been permitted to roll in the first roll direction 332 at the first roll rate for a preselected period of time (e.g., the divergence time period $\Delta T_D$), the divergence rocket 324 terminates firing (e.g., the fuel becomes spent) and the compensation rocket 326 is fired at a second time $T_2$ and combusts for a compensation time period $\Delta T_C$. Firing the compensation rocket 326 generates a compensation force that produces a compensation roll moment 334 about the roll axis 330 that causes the ejection seat 320 to rotate about the roll axis 330 in a second roll direction 336 (e.g., a clockwise direction when viewed from the aft direction toward the forward direction of the aircraft) and at a second roll rate. After the ejection seat 320 has been permitted to roll in the second roll direction 336 at the second roll rate for a preselected period of time (e.g., the compensation time period $\Delta T_C$), the compensation rocket 326 terminates firing (e.g., the fuel becomes spent). Firing of the compensation rocket 326 brings to zero both the first roll rate and the second roll rate and terminates any further rotation of the ejection seat 320 in both the first roll direction 332 and the second roll direction 336. Thus, following expiration of the compensation time period $\Delta T_C$ (e.g., at a third time $T_3$), the ejection seat 320 will be reoriented from its initial divergence trajectory and will no longer be experiencing roll in either of the first roll direction 332 or the second roll direction 336. At this point in time (e.g., at the third time $T_3$) during the ejection sequence or operation, the occupant may be separated from the ejection seat 320.

Still referring to FIGS. 3A and 3B, the ejection seat 320 includes a base 338 to which each of the main ejection rocket 322, the divergence rocket 324 and the compensation rocket 326 may be attached. In various embodiments, each of the main ejection rocket 322, the divergence rocket 324 and the compensation rocket 326 includes a nozzle that is oriented in a direction that is generally perpendicular to the roll axis 330, such that the force produced by each rocket, and, in particular, the divergence rocket 324 (oriented in a first direction) and the compensation rocket 326 (oriented in a second direction), is perpendicular to the roll axis 330. Such orientation helps to ensure that firing of the divergence rocket 324 and the compensation rocket 326 will reorient the ejection seat 320 about the roll axis 330 during operation. In various embodiments, for example, the roll axis 330 may be defined to extend in a direction parallel to the Z-axis illustrated in FIGS. 3A and 3B, while the force vectors resulting from operation of the divergence rocket 324 and the compensation rocket 326 will extend in directions that are generally parallel to the Y-axis illustrated in FIGS. 3A and 3B. Such an orientation will tend to prevent the divergence rocket 324 and the compensation rocket 326 from contributing any forces that would otherwise tend to rotate the ejection seat 320 in a yaw direction (e.g., rotation about the Y-axis) or in a pitch direction (e.g., rotation about the X-direction).

While the compensation rocket 326 is illustrated and described as being oriented generally in the negative Y-direction, to produce a thrust in the positive Y-direction and a moment about the roll axis 330, thereby causing the ejection seat 320 to rotate in the second roll direction 336, in various embodiments, the compensation rocket 326 may be oriented in other directions with the same result. In various embodiments, for example, the compensation rocket 326 may be oriented in the negative X-direction to produce a thrust in the positive X-direction and a moment about the roll axis 330, which will also cause the ejection seat 320 to rotate in the second roll direction 336 upon firing. In such embodiments, the force vector resulting from operation of the compensation rocket 326 will extend in a direction that is generally perpendicular to the Y-axis illustrated in FIGS. 3A and 3B. Other orientations of the compensation rocket 326 are contemplated, including orientations that produce moments about not just the roll axis 330, but about the yaw and pitch axes as well, though the main component of the resulting force vector (or the component having the greatest magnitude) will be to cause a moment about the roll axis 330 to cause the ejection seat 320 to rotate in the second roll direction 336.

Note also that while the divergence rocket 324 and the compensation rocket 326 are illustrated as single components in FIGS. 3A and 3B, the disclosure contemplates any number of divergence rockets and compensation rockets, not all of which need be oriented in the same direction or fired at the same time. In various embodiments, for example, the ejection seat 320 may include a first divergence rocket oriented to provide a first divergence thrust in the positive Y-direction (as illustrated in FIG. 3A) and a second divergence rocket oriented to provide a second divergence thrust in the negative X-direction. In such embodiments, both the first divergence thrust and the second divergence thrust contribute to the divergence roll moment 328 about the roll axis 330 that causes the ejection seat 320 to rotate about the roll axis 330 in the first roll direction 332. Similarly, in various embodiments, the ejection seat 320 may include a first compensation rocket oriented to provide a first compensation thrust in the positive Y-direction (as illustrated in FIG. 3A) and a second compensation rocket oriented to provide a second compensation thrust in the positive X-direction. In such embodiments, both the first compensation thrust and the second compensation thrust contribute to the compensation roll moment 334 about the roll axis 330 that causes the ejection seat 320 to rotate about the roll axis 330 in the second roll direction 336.

In various embodiments, the size or strength of the various divergence rockets and the compensation rockets may also be varied—e.g., the ejection seat 320 may comprise a single divergence rocket and a plurality of compensation rockets, with the divergence rocket having a size or strength that is relatively large in comparison to the size and strength of the compensation rockets. Various factors considered in the size or strength and the placement or orientation of the various divergence and compensation rockets includes weight and center-of-gravity of the ejection seat and the occupant, the potential for pitch, roll and yaw produced by the various divergence and compensation rockets as well as the main ejection rocket, and the performance of the primary propulsion system (e.g., the main ejection rocket), including, for example, the thrust profile and the duration of impulse. Various other consideration may include platform design, seat design and aircrew population specifics (e.g., mean or average heights or weights of pilots or occupants expected to fly or operate the aircraft).

In addition to the foregoing, the ejection seat 320 may include or be coupled to a processor 340. The processor 340 will typically be configured to operate each of the main ejection rocket 322, the divergence rocket 324 and the compensation rocket 326. For example, following firing of the main ejection rocket 322 at the initial time $T_0$, the processor 340 may be configured to fire the divergence rocket 324 at the first time $T_1$ and the compensation rocket 326 at the second time $T_2$. In various embodiments, the processor 340 may be configured to fire the divergence rocket 324 and the compensation rocket 326 based on preset values of the first time $T_1$ and the second time $T_2$ or, in various embodiments, the first time $T_1$ and the second time $T_2$ may be computed on the fly based on feedback provided to the processor via a sensor 342 configured to detect one or more of a roll rate (e.g., a time dependent value of rotation in terms of radians per second of the first roll direction 332 and the second roll direction 336) or a roll position (e.g., a time dependent value of the relative position of the ejection seat 320 in the first roll direction 332 and the second roll direction 336 with respect to a reference position). In various embodiments, the processor 340 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof.

Figure 4A:
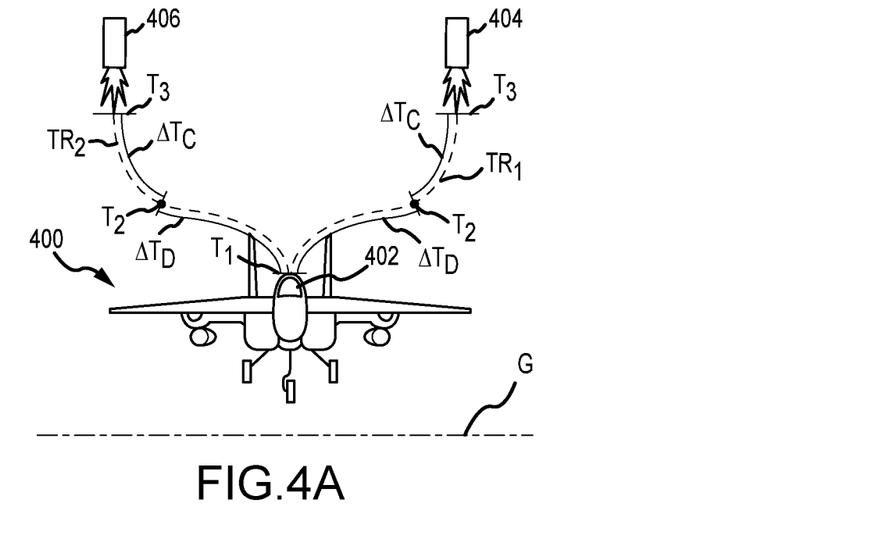
FIGS. 4A and 4B illustrate trajectories of a pair of ejection seats and occupants during firing of a divergence rocket during a first phase of an ejection sequence or operation, followed by firing of a compensation rocket during a second phase of an ejection sequence or operation, in accordance with various embodiments.
Figure 4B:
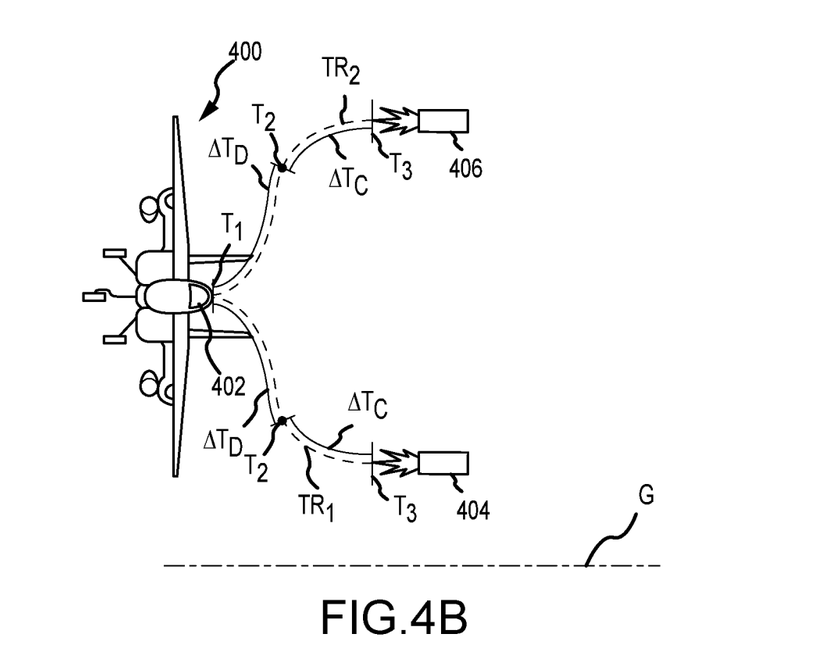

Referring now to FIGS. 4A and 4B, two scenarios are illustrated where a pair of ejection seats and occupants are ejected from an aircraft 400 having a cockpit 402 during an emergency. The first scenario, illustrated in FIG. 4A, shows the pilots ejecting while the aircraft 400 is in an upright orientation with respect to the ground, while the second scenario, illustrated in FIG. 4B, shows the pilots ejecting while the aircraft 400 is in a ninety-degree (90°) orientation with respect to the ground, G. As illustrated in both FIGS. 4A and 4B, during an ejection sequence or operation, a first ejection seat 404 (together with its occupant) is configured to travel along a first trajectory $TR_1$ while the second ejection seat 406 (together with its occupant) is configured to travel along a second trajectory $TR_2$. Both the first ejection seat 404 and the second ejection seat 406 share similar construction and operational characteristics to the ejection seat 320 described above with reference to FIGS. 3A and 3B.

Similar to the foregoing description with respect to FIGS. 3A and 3B, a main ejection rocket (e.g., the main ejection rocket 322) within each of the first ejection seat 404 and the second ejection seat 406 is fired at an initial time $T_0$ and the ejection seats begin their ejection from the cockpit 402 of the aircraft 400. Shortly after the initial time $T_0$, a divergence rocket (e.g., the divergence rocket 324) within each of the first ejection seat 404 and the second ejection seat 406 is fired at a first time $T_1$ and combusts for a divergence time period $\Delta T_D$. After the first ejection seat 404 and the second ejection seat 406 have been permitted to roll in their respective first roll directions at their first roll rates (which may be time-dependent as described above) for a preselected period of time (e.g., the divergence time period $\Delta T_D$) or periods of time computed on the fly, the divergence rockets terminate firing (e.g., the fuel becomes spent or a processor terminates the firing), a compensation rocket (e.g., the compensation rocket 326) within each of the first ejection seat 404 and the second ejection seat 406 is fired at a second time $T_2$ and combusts for a compensation time period $\Delta T_C$. After the first ejection seat 404 and the second ejection seat 406 have been permitted to roll in their respective second roll directions at their second roll rates (which may be time-dependent as described above) for a preselected period of time (e.g., the compensation time period $\Delta T_C$) or periods of time computed on the fly, the compensation rockets terminate firing (e.g., the fuel becomes spent or a processor terminates the firing). Firing of the compensation rockets brings to zero both the first roll rate and the second roll rate and terminates any further rotation of the ejection seats in both the first roll directions and the second roll directions. Thus, following expiration of the compensation time period $\Delta T_C$ (e.g., at a third time $T_3$), the ejection seats will be reoriented from their initial divergence trajectories and will no longer be experiencing roll in either of the respective first and second roll directions. At this point in time during the ejection sequence or operation (e.g., at the third time $T_3$), the occupants may be separated from their respective ejection seats. In various embodiments, additional divergence rockets or compensation rockets may be fired at subsequent times to more accurately control the trajectory of the ejection seat 406.

Figure 5:
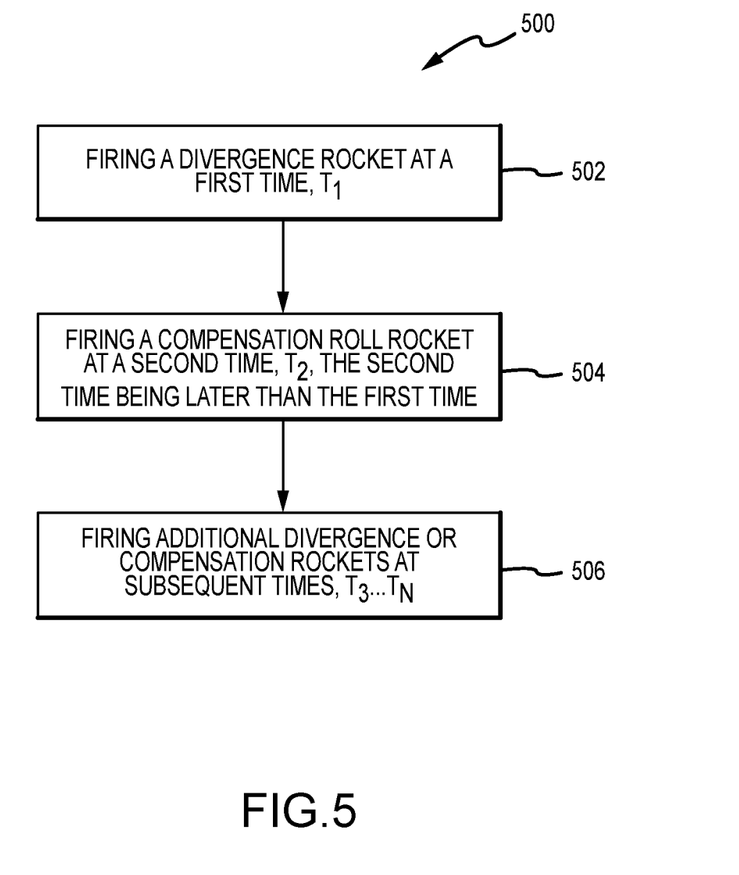
FIG. 5 describes various steps used in a method for controlling roll of an ejection seat during an ejection sequence or operation, in accordance with various embodiments.

Referring now to FIG. 5, a method 500 of controlling a trajectory of an ejection seat having a divergence rocket and a compensation rocket is described as including the following steps. A first step 502 includes firing the divergence rocket at a first time, $T_1$. A second step 504 includes firing the compensation rocket at a second time, $T_2$, the second time being later than the first time. In various embodiments, the first time is a first preset time following an initial time at which a main ejection rocket is fired, and the second time is a second preset time following the initial time at which the main ejection rocket is fired. In various embodiments, a third step 506 (or a series of sub-steps) includes firing additional divergence rockets or compensation rockets at subsequent times, $T_3 \ldots T_N$, where $T_3$ is later than $T_2$ and N is the number of subsequent rocket firings that occur.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An ejection seat for an aircraft, comprising:
 a base of the ejection seat;
 a main ejection rocket attached to and oriented perpendicular to the base of the ejection seat, the orientation of the main ejection rocket being parallel with a yaw axis of the ejection seat;
 a divergence rocket attached to and oriented perpendicular to the base of the ejection seat, the divergence rocket being disposed on a first side of the main ejection rocket along a pitch axis of the ejection seat;
 a compensation rocket attached to and oriented perpendicular to the base of the ejection seat, the compensation rocket being disposed on a second side of the main ejection rocket opposite the divergence rocket along the pitch axis;
 a roll sensor mounted to the ejection seat and configured to produce an output; and
 a processor operatively coupled to the roll sensor, the processor configured to fire the main ejection rocket, the divergence rocket, and the compensation rocket based on the output of the roll sensor.

2. The ejection seat of claim 1, wherein the ejection seat defines the roll axis, the yaw axis and the pitch axis, each of which is pair-wise perpendicular, and wherein firing the divergence rocket causes the base of the ejection seat to roll in a first roll direction about the roll axis.

3. The ejection seat of claim 2, wherein firing the compensation rocket causes the base of the ejection seat to roll in a second roll direction about the roll axis that is opposite the first roll direction.

4. The ejection seat of claim 1, wherein a divergence force that is generated by the divergence rocket is perpendicular to the roll axis.

5. The ejection seat of claim 4, wherein a compensation force that is generated by the compensation rocket is perpendicular to the roll axis.

6. The ejection seat of claim 1, wherein the processor is configured to fire each of the main ejection rocket, the divergence rocket, and the compensation rocket at at least one of a preset time and a time that is computed on the fly.

7. The ejection seat of claim 6, wherein the sensor produces an output corresponding to at least one of a roll direction, a roll rate, and a roll position of the ejection seat around a roll axis, and wherein the processor is configured to first time fire at least one of the main ejection rocket, the divergence rocket, and the compensation rocket at a time that is computed on the fly is based on the output of the sensor.

8. The ejection seat of claim 7, wherein the processor is configured to fire the ejection rocket at an initial time, the divergence rocket at a first preset time, and the compensation rocket at a second preset time, the second preset time being after than the first preset time.

9. The ejection seat of claim 8, wherein the first preset time follows an initial time at which a main ejection rocket is fired.

10. The ejection seat of claim 9, wherein the second preset time follows the initial time at which the main ejection rocket is fired.

11. The ejection seat of claim 1, further comprising
 at least one of an additional divergence rocket and additional compensation rocket, the at least one additional divergence rocket being oriented parallel to the base of the ejection seat in a third direction that is perpendicular to the orientation of the divergence rocket, and the at least one additional compensation rocket being oriented parallel to the base of the ejection seat in a fourth direction that is opposite the third direction.

12. The ejection seat of claim 11, wherein the divergence rocket, the compensation rocket, the at least one of an additional divergence rocket and an additional compensation rocket comprise a plurality of divergence and compensation rockets, and wherein a strength of at least one of the plurality of divergence and compensation rockets are different from each other.

13. A method of controlling a trajectory of an ejection seat having a main ejection rocket, a divergence rocket and a compensation rocket, comprising:
firing the main ejection rocket at an initial time, the main ejection rocket being oriented parallel with a yaw axis of the ejection seat;
firing the divergence rocket at a first time to rotate the ejection seat in a first roll direction, the divergence rocket being oriented along a pitch axis of the ejection seat;
firing the compensation rocket at a second time to rotate the ejection set in a second roll direction that is opposite to the first direction, the compensation rocket being oriented along the pitch axis, the second time being later than the first time; and
sensing at least one of a roll direction, a roll rate, and a roll position of the ejection seat around a roll axis,
wherein firing at least one of the main ejection rocket, divergence rocket, and the compensation rocket is based on the sensing at least one of the roll direction, the roll rate, and the roll position of the ejection seat around the roll axis.

14. The method of claim 13, wherein the ejection seat defines the roll axis, the yaw axis and the pitch axis, each of which is pair-wise perpendicular, and wherein firing the divergence rocket causes the base of the ejection seat to roll in a first roll direction at a first roll rate about the roll axis.

15. The method of claim 14, wherein firing the compensation rocket causes the base of the ejection seat to roll in a second roll direction at a second roll rate about the roll axis that is opposite the first roll direction, and wherein firing the compensation rocket brings the second roll rate to zero.

16. The method of claim 15, wherein a divergence force that is generated by the divergence rocket is perpendicular to the roll axis.

17. The method of claim 16, wherein a compensation force that is generated by the compensation rocket is perpendicular to the roll axis.

18. The method of claim 13, wherein the processor is configured to fire each of the main ejection rocket, the divergence rocket, and the compensation rocket at at least one of a preset time and a time that is computed on the fly.

19. The method of claim 18, wherein the first time is a first preset time following the initial time at which a main ejection rocket is fired.

20. The method of claim 19, wherein the second time is a second preset time following the initial time at which the main ejection rocket is fired.

* * * * *

UNITED STATES PATENT AND TRADEMARK OFFICE
CERTIFICATE OF CORRECTION

PATENT NO. : 11,465,762 B2
APPLICATION NO. : 16/983622
DATED : October 11, 2022
INVENTOR(S) : Steve Holstine et al.

It is certified that error appears in the above-identified patent and that said Letters Patent is hereby corrected as shown below:

In the Claims

Column 10, Line 43 - after the word "to" please delete "first time"

Signed and Sealed this
Thirty-first Day of January, 2023

*Katherine Kelly Vidal*

Katherine Kelly Vidal
*Director of the United States Patent and Trademark Office*